United States Patent
Espinasse (10) Patent No.: US 10,137,864 B2
(45) Date of Patent: Nov. 27, 2018

(54) PRIMARY PART AND SECONDARY PART OF AN END FITTING FOR A WIPER

(75) Inventor: Philippe Espinasse, Coudes (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 515 days.

(21) Appl. No.: 14/008,667

(22) PCT Filed: Mar. 26, 2012

(86) PCT No.: PCT/EP2012/055325
§ 371 (c)(1),
(2), (4) Date: Dec. 19, 2013

(87) PCT Pub. No.: WO2012/130800
PCT Pub. Date: Oct. 4, 2012

(65) Prior Publication Data
US 2014/0090200 A1    Apr. 3, 2014

(30) Foreign Application Priority Data
Mar. 31, 2011 (FR) ..................................... 11 52718

(51) Int. Cl.
*B60S 1/38* (2006.01)
*B60S 1/52* (2006.01)

(52) U.S. Cl.
CPC .......... *B60S 1/3887* (2013.01); *B60S 1/3891* (2013.01); *B60S 1/524* (2013.01); *B60S 1/381* (2013.01); *B60S 1/3889* (2013.01); *B60S 1/3893* (2013.01); *B60S 1/3896* (2013.01)

(58) Field of Classification Search
CPC .... B60S 1/3889; B60S 1/3891; B60S 1/3893; B60S 1/524; B60S 1/3862

USPC ......... 15/250.32, 250.361, 250.452
See application file for complete search history.

(56) References Cited

U.S. PATENT DOCUMENTS

| 3,885,265 A | 5/1975 | Deibel et al. | |
| 2010/0024149 A1* | 2/2010 | Erdal | B60S 1/3868 |
| | | | 15/250.32 |
| 2010/0180395 A1* | 7/2010 | Aznag | B60S 1/38 |
| | | | 15/250.31 |

FOREIGN PATENT DOCUMENTS

| DE | 10000373 A1 * | 8/2001 | ............ B60S 1/3806 |
| FR | 2 920 729 A1 | 3/2009 | |
| FR | 2 929 904 A1 | 10/2009 | |

OTHER PUBLICATIONS

DE10000373A1 (machine translation), 2001.*
FR2920729A1 (machine translation), 2009.*
(Continued)

*Primary Examiner* — Andrew A Horton
(74) *Attorney, Agent, or Firm* — Osha Liang LLP (57) ABSTRACT

The invention relates to a first part (12) and a second part (13) of an end piece (11) for a windshield wiper comprising at least one wiper blade (1). The first part (12) has a cavity (22) for accommodating the wiper blade (1), said cavity (22) extending along a longitudinal axis. The first part (12) also has a region that is arranged laterally in relation to the longitudinal axis and accommodates the second part (13) of the end piece (11), said region (14) comprising a tubular section (31). The second part (13) also has an attachment means for mechanically connecting the second part (13) to the region of the first part (12). The attachment means represents at least one hollow tubular portion, the periphery of which has a slit.

11 Claims, 6 Drawing Sheets

(56) References Cited

OTHER PUBLICATIONS

Office Action issued in corresponding Mexican Application No. MX/a/2013/011339, dated Sep. 2, 2015 (8 pages).
Office Action in counterpart Chinese Patent Application No. 201280026541.0, dated Mar. 11, 2016 (17 pages).
International Search Report for corresponding International Application No. PCT/EP2012/055325, dated Jun. 14, 2012 (4 pages).

* cited by examiner

PRIMARY PART AND SECONDARY PART OF AN END FITTING FOR A WIPER

The field of the present invention is that of equipment for wiping windows, in particular of a motor vehicle.

Motor vehicles are commonly equipped with windshield wiper systems for washing the windshield and avoiding disruption to the driver's view of his surroundings. These windshield wipers are conventionally driven by an arm that carries out an angular to-and-fro movement and has elongate wipers which themselves carry squeegee blades made of a resilient material. These blades rub against the windshield and evacuate the water by removing it from the driver's field of view. The wipers are produced in the form either, in a conventional version, of articulated brackets which hold the squeegee blade at a number of discrete locations or, in a more recent version, known as the "flat blade" version, of a semi-rigid assembly which holds the squeegee blade along its entire length. In both solutions, the wiper is attached to the turning arm of the windshield wiper by a connector.

Should the wiping quality deteriorate, it is then necessary to renew the wiping means. There are two solutions: the first consists in replacing the entire wiper with a new wiper while the second solution consists in replacing the squeegee blade while retaining the rest of the wiper.

The invention relates more particularly to this second solution, which involves removing one end of the wiper in order to access the squeegee blade.

In order to fasten the squeegee blade to the constituent support of the wiper, the latter has an end fitting which is mounted at one end of this support and has means for securing it with respect to the support.

Furthermore, windshield wipers are also equipped with devices for feeding a windshield washer liquid which is fed from a tank located on the vehicle and which is sprayed in the direction of the windshield by nozzles located either around the windshield or on the windshield wiper itself for improved distribution of the liquid.

The drawback of this second situation, when only the squeegee blade is replaced, is that the device for feeding liquid is open and thus causes a leak. Furthermore, opening the device for feeding liquid during the phase of replacing the blade produces a risk of impurities entering the device. Such a situation is problematic since these impurities block the nozzles, thereby considerably impairing the efficiency of washing the windshield.

Another drawback of such a situation lies in the difficulty of replacing such a squeegee blade. Specifically, it is appropriate to provide a solution which is as ergonomic as possible for replacing the blade, and it will be appreciated that the presence of a liquid in the handling area complicates the replacement of the blade and the satisfactory refitting thereof. Furthermore, the residual pressure inside the device for feeding liquid can cause liquid to be projected onto the user, it being desirable to avoid this.

The object of the present invention is thus to solve the above-described drawbacks mainly by blocking the device for feeding liquid while enabling easy removal of the squeegee blade from the support of the wiper. Such an object is achieved by the primary part according to the invention, the secondary part according to the invention and the combination of these two parts.

The subject of the invention is thus a primary part of an end fitting for a wiper having at least one wiper blade, the primary part comprising a recess that is able to receive the wiper blade and extends along a longitudinal axis, said primary part furthermore comprising a zone formed laterally with respect to the longitudinal axis along which the recess extends, and able to receive a secondary part of the end fitting, said zone comprising a tubular sector.

According to a first feature of the invention, the primary part comprises at least one blocking means that is able to plug a liquid channeling device that is a constituent part of the wiper.

According to a second feature of the invention, the tubular sector extends in a primary direction parallel to the longitudinal axis.

Advantageously, the tubular sector has a cylindrical section.

According to another feature of the invention, the primary part comprises a body in which the recess is formed, said primary part having an aperture between the body and the tubular sector.

According to a further feature of the invention, the recess is bordered by a primary coupling device that is able to bear against the blade.

The subject of the invention also concerns a secondary part of an end fitting for a wiper having at least one wiper blade, the secondary part comprising a locking means able to immobilize the blade with respect to a primary part that is a constituent part of the end fitting, said secondary part furthermore comprising a fastening means that is able to mechanically connect the secondary part to a zone of the primary part, wherein the fastening means is at least one hollow tubular portion, the periphery of which has a slot.

According to one feature of the invention, the hollow tubular portion extends in a secondary direction, while the slot is rectilinear along the hollow tubular portion.

Advantageously, a wall which originates at least on the hollow tubular portion is provided.

Advantageously, the locking means is formed by a finger designed to pass through the blade.

In an alternative or complementary manner, the locking means is formed by a secondary coupling device that is able to bear against the blade.

The wall connects two hollow tubular portions, thereby delimiting an internal volume, the locking means being formed by a protuberance which extends into said internal volume.

Of course, the invention covers an end fitting of a wiper having at least one wiper blade, the end fitting comprising a primary part and a secondary part as detailed hereinabove.

Advantageously, the secondary part of the end fitting comprises a wall which originates on at least one hollow tubular portion and forms a first profile, the primary part comprises a flank which defines an outer periphery of the primary part and forms a second profile, and wherein the first profile is at least partially identical to the second profile. The expression "identical profile" should be understood as meaning that the outer contour of the secondary contour is inscribed in the outer contour of the primary part so as not to protrude from the latter in the assembled state. The appearance of the wiper which receives such an end fitting is thus improved.

Finally, the invention covers a wiper comprising at least one wiper blade and an end fitting as described hereinabove, the wiper advantageously comprising at least one liquid channeling device and a vertebra.

A first advantage of the invention lies in the fact that the secondary part can be extracted from the primary part without the presence of liquid that is liable to complicate this extraction. Such extraction thus makes it possible to replace the blade in a dry environment, thereby avoiding any projection of liquid onto the user when the blade is fitted and removed. Since the primary part remains on the wiper, the device for feeding windshield washer liquid is not open, this consequently preventing the introduction of impurities into the lines.

Another advantage lies in the fact that it is particularly simple to replace the blade since a single operation suffices to free or immobilize the squeegee blade with respect to the rest of the wiper. Such an operation does not require that a button be pressed beforehand, or the extraction of an intermediate part, for example.

Further features, details and advantages of the invention will become more clearly apparent from reading the description given hereinbelow by way of illustration and with reference to the drawings, in which

Figure 1:
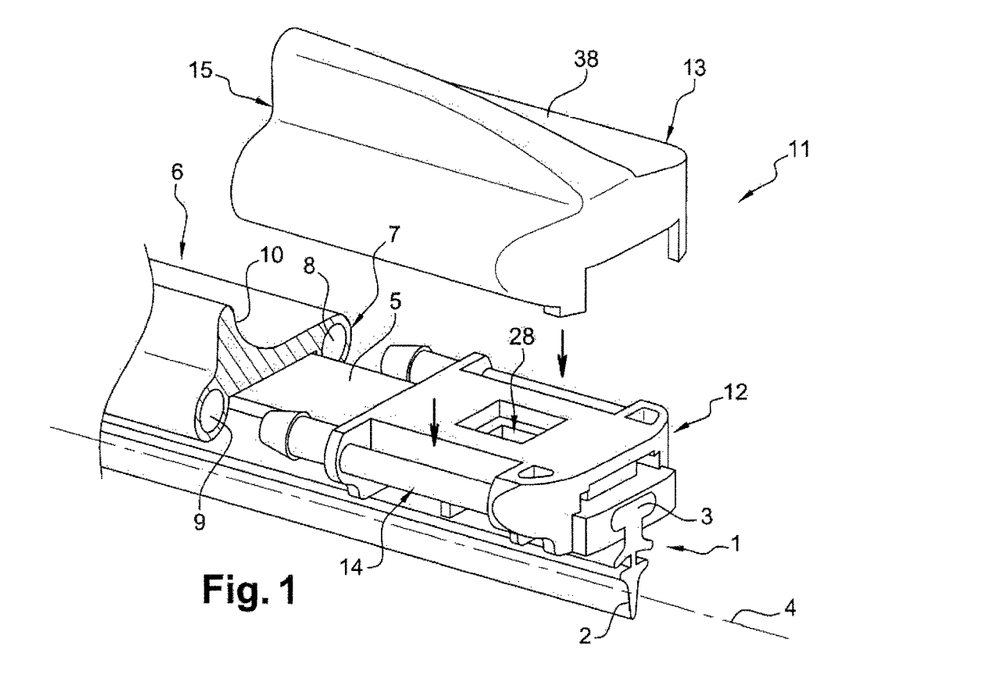
FIG. 1 is a perspective view of a first variant of an end fitting according to the invention installed at the end of a wiper.

FIG. 1 shows in a partial manner a wiper with which a wiper system mounted on a motor vehicle is provided. This wiper is installed on the front windshield but it may also be mounted on the rear window of the vehicle.

The wiper comprises a wiper blade 1, also known as a squeegee blade, consisting of an area 2 for rubbing against the window and a heel 3 which ensures the mechanical connection to a constituent support of the wiper. This wiper blade 1 extends lengthwise along a first axis 4.

The wiper furthermore comprises a vertebra 5 which forms a stiffening device of the wiper. By way of example, this is a single metal strip which extends along the first axis 4 and which has at rest a convex curvature with respect to the windshield. This strip has a predetermined flexibility, which, by deforming when the wiper is pressed against the windshield, brings about a force distributed along the length of the wiper blade 1.

The blade 1 and the vertebra 5 are held by the support 6 which thus forms a longitudinal supporting frame covering the vertebra 5 and the wiper blade 1.

The wiper blade is provided with a liquid channeling device 7 which is secured to the support 6, for example by clip-fastening, adhesive bonding or more generally by cooperating shapes. The liquid channeling device 7 may also be produced in one piece with the support 6, as is the case in FIG. 1. The liquid channeling device 7 is in particular in the form of at least two ducts 8 and 9 which extend longitudinally along the wiper along an axis which is for example parallel to the first axis 4, and on either side of the wiper blade 1. More specifically, these ducts 8 and 9 are located on the sides of the support 6 and in the continuation of the plane in which the support 6 extends. This liquid channeling device 7 is manufactured from a flexible material, for example a rubber or an elastomer.

The liquid channeling device 7 may be formed jointly with an air deflector 10, the function of which is to increase the bearing force of the wiper on the windshield, to the benefit of the aerodynamic effect of the air. In this exemplary embodiment, the air deflector 10 and the liquid channeling device 7, in particular the two ducts 8 and 9, are molded from one and the same flexible material, such as a rubber or an elastomer. The air deflector 10 and the liquid channeling device 7 thus form a single part.

At the end of the wiper there is installed an end fitting 11. In a general manner, this end fitting 11 carries out a multiplicity of functions:
  it blocks the liquid channeling device 7 of the wiper,
  it allows the wiper blade 1 to be fitted on and removed from the support 6,
  it secures the wiper blade 1 with respect to the support 6. Securing should be understood here as meaning a means for blocking the translation of the wiper blade 1 with respect to the support 6. Thus, once the end fitting 11 is in place, any movement in translation of the wiper blade 1 is prevented, thereby guaranteeing perfect fastening of the latter with respect to the rest of the wiper.

The end fitting 11 comprises a primary part 12 and a secondary part 13 which are mechanically connected together in a removable manner. The secondary part 13 has an outer section generally complementary to the outer section of the support 6, of the channeling device 7 and of the deflector 10. Thus, these three components pass into an internal volume 15 made in the secondary part 13.

The primary part 12 has a function of retaining the wiper blade 1, a function of retaining the vertebra 5 and a function of blocking the liquid channeling device 7, while the secondary part 13 ensures that the wiper blade 1 and the vertebra 5 are positioned correctly along the first axis 4.

Figure 2:
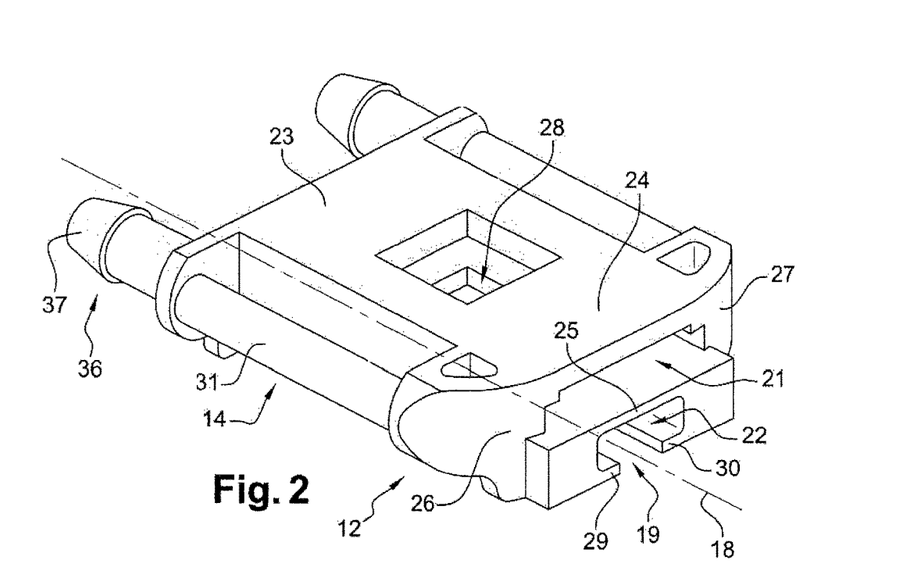
FIG. 2 is a perspective view which shows in detail a first embodiment of the primary part according to the invention.

FIG. 2 shows the primary part 12 comprising a housing 21 that is able to receive the vertebra and a recess 22 that is able to receive the wiper blade, this recess 22 extending along a longitudinal axis 18 parallel to the first axis 4 along which the wiper blade 1 extends.

The housing 21 is formed in a constituent body 23 of the primary part 12. This housing 21 corresponds to a rectangular removal of material which extends along the first axis 4. The shape of this housing 21 is complementary to a cross section of the vertebra. This housing 21 is thus delimited on one side by an upper constituent wall 24 of the body 23, and on the other side by an intermediate wall 25. Laterally, this housing 21 is bordered by two flanks having the references 26 and 27.

The recess 22 receives the heel of the wiper blade. This recess 22 extends longitudinally in the body 23, opposite the housing 21 with respect to the intermediate wall 25. It will be understood that the latter delimits both the housing 21 and the recess 22. The body 23 also comprises a cutout 19 which is aligned with the recess 22 and which opens the latter toward the surroundings of the primary part 12. Such a cutout 19, which has a smaller width than the width of the recess 22 measured along a transverse axis perpendicular to the longitudinal axis 4, enables the passage of a portion of the heel. This cutout 19 is bordered by a first edge surface 29 and a second edge surface 30, the latter serving as a slide for extracting or inserting the wiper blade.

Figure 3:
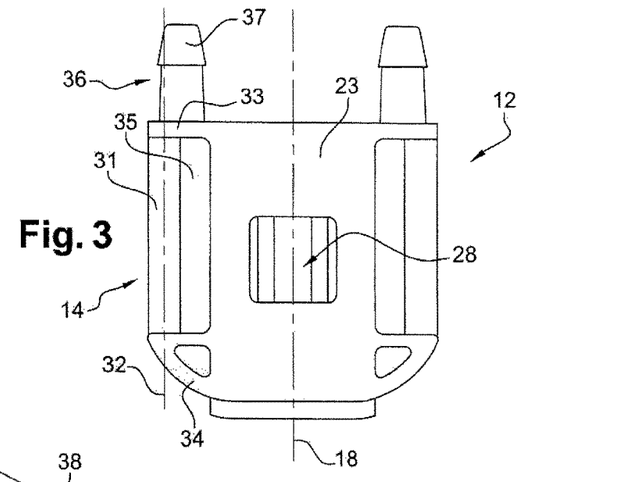
FIG. 3 is a top view of the primary part illustrated in FIG. 2.

FIGS. 2 and 3 show the primary part 12 comprising a hole 28 which opens into the housing 21 and into the recess 22. In practice, the hole 28 passes through the intermediate wall 25 and thus connects the volume delimited by the housing 21 and the volume delimited by the recess 22. Outside this hole 28, which extends in an axis orthogonal to the upper wall 24, the housing 21 is distinct or separate from the recess 22.

The section of this hole 28 produced in the upper wall 24 and in the intermediate wall 25 is equivalent to the section of a locking means which can be seen in FIGS. 4 to 7.

FIGS. 2 and 3 also show the presence of a zone 14 formed laterally with respect to the longitudinal axis 18 along which the recess 22 extends. The longitudinal axis 18 forms an axis of symmetry which virtually divides the primary part 12 into two portions having an identical structure. Such a zone 14 is able to receive the secondary part 13 of the end fitting 11. It will thus be understood that the function of this zone 14 formed on the side of the primary part 12 has the function of fastening the secondary part 13.

The constitution of the zone 14 will now be described in detail, it being understood that the primary part has two distinct zones 14 on either side of the body 23 with respect to the longitudinal axis 18. The following description relates to a first of these zones, but it will be understood that this description is applicable to the second.

In the primary part 12, this zone 14 comprises a tubular sector 31 which extends in a primary direction which is inscribed in a plane parallel to the plane of the upper wall 24. More specifically, this primary direction of the tubular sector 31, which has the reference 32, is parallel to the longitudinal axis 18.

The tubular sector 31 is rectilinear and has a cylindrical, in particular circular, section in cross section orthogonal to the primary direction 32. It is formed for example by a solid or hollow tube having a peripheral wall which extends peripherally through 360° around the primary direction 32 when the latter is placed in the center of the tube.

The tubular sector 31 is located at the periphery of the body 23. This tubular sector 31 is formed laterally with respect to the housing 21, that is to say on the side of the body 23 and in the continuation of this housing 21 in a plane parallel to the plane of the upper wall 24.

The tubular sector 31 is connected to the body 23 by at least two arms, respectively having the references 33 and 34, that are formed at each end of the body 23, along the longitudinal axis 18. Such a disposition makes it possible to form an aperture 35 between the body 23 and the tubular sector 31, such an aperture 35 making it possible to receive a constituent fastening means of the secondary part, as will be detailed hereinbelow.

An exemplary embodiment of a blocking means 36 is shown in these figures. This blocking means 36 has the function of plugging, or closing, the fluid channeling device of the wiper. To do this, the primary part 12 comprises a stud 37 arranged so as to face the duct 8 or 9. This stud is a tubular protuberance which extends along an axis parallel to the longitudinal axis 18 and coincident with an axis along which the duct in question extends. The outside diameter of this stud 37 is slightly greater than the inside diameter of the respective duct. Since the constituent material of the ducts is flexible, this material deforms in order to fit over the stud 37 and thus to be liquid-tight. It will finally be noted that the free end of the stud 37 has a bevel which makes it easier to introduce the stud into the duct.

The blocking means 36 may have other embodiments as long as it seals the liquid channeling device at the ends of the wiper. By way of example, the blocking device may be formed by planar abutment of the end of the ducts 8 or 9 directly against a flank of the body 23.

The above description of the primary part 12 mentions features on one side of this primary part, but it goes without saying the opposite side has identical features. In other words, the primary part 12 comprises a blocking means 36 which has two studs 37 and two tubular sectors 31, each separated from the body 23 by an aperture 35.

Figure 4:
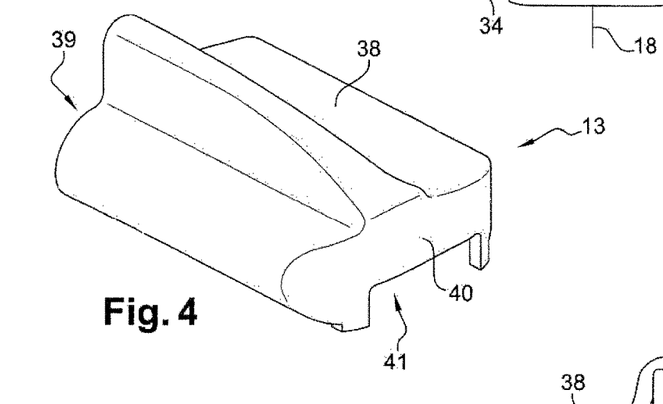
FIG. 4 is a perspective top view of a first embodiment of the secondary part according to the invention.
Figure 5:
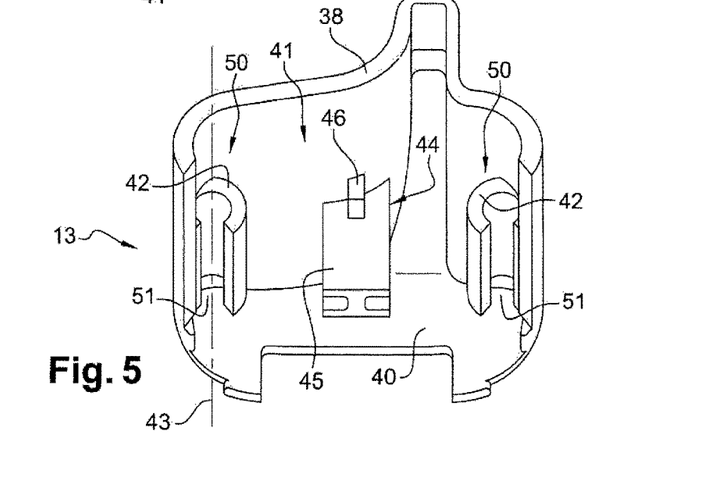
FIG. 5 is a perspective bottom view of the secondary part from FIG. 4.
Figure 6:
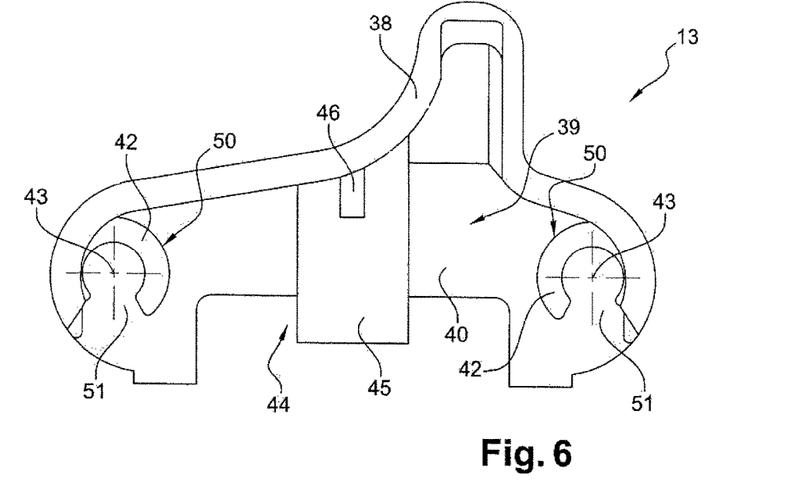
FIG. 6 is a side view of the secondary part illustrated in FIGS. 4 and 5.

FIGS. 4 to 6 show the secondary part 13 that is used in the first variant of the end fitting. Such a secondary part 13 forms a cover which, when the wiper is placed in a horizontal plane, covers the primary part. In other words, this secondary part 13 is placed above and in the continuation of the primary part and has a peripheral wall 38 having a shape corresponding to, in other words complementary with, the shape of the support, including the liquid channeling means and/or the deflector.

The secondary part 13 comprises at least one fastening means 50 that is able to mechanically connect the secondary part 13 to the zone 14 of the primary part 12, as is detailed in FIGS. 2 and 3. Since this connection has to be releasable, the fastening means is designed to be removable from the primary part. In this first variant embodiment of the end fitting, the secondary part 13 comprises two distinct and separate fastening means 50.

The peripheral wall 38 originates on each connecting means 50 formed on the secondary part 13. This peripheral wall 38 also comprises an open end 39 into which the wiper support extends when the end fitting is assembled thereon, and furthermore has an end wall 40 opposite the open end 39. Such an organization delimits an internal volume 41. It will be noted that the end wall 40 has a cutout which engages with the end of the primary part.

The fastening means 50 is produced by cooperating shapes formed both on the primary part and on the secondary part.

As far as the secondary part 13 is concerned, this fastening means 50 is formed by at least one hollow tubular portion 42 which extends in a secondary direction 43. This hollow tubular portion 42 is for example in the form of a circular arc. The hollow tubular portion 42 is open along its length and hollowed out in its center so as to allow the tubular sector of the primary part to be positioned inside the hollow tubular portion 42. The latter is thus formed by a hollow tube having a central axis coincident with the secondary direction 43 and with the primary direction 32, when the secondary part 13 is fastened to the primary part 12. The inside diameter of the hollow tubular portion 42 is identical, to within manufacturing tolerances, to the outside diameter of the tubular sector formed on the primary part.

The hollow tubular portion 42 is open in that it has a slot 51 which extends lengthwise in a direction parallel to the secondary direction 43. In other words, the hollow tubular portion 42 is formed by a circular arc which extends peripherally between 181° and 270°. Such a slot 51 is rectilinear along the hollow tubular portion 42 and its width is, in particular, constant. Such dispositions give the hollow tubular portion 42 flexibility so as to allow the introduction of the tubular sector of the primary part. Reliable but releasable fastening is thus produced between the primary part and the secondary part 13.

A locking means 44 can also be seen in FIGS. 5 and 6. This locking means 44 has the function of immobilizing the end fitting with respect to the wiper, in particular so as to prevent any movements along the first axis 4, known hereinbelow as movements in translation. The locking means 44 is also the device which, simultaneously with the fastening between the primary part and the secondary part, prevents the wiper from moving in translation.

In the first variant embodiment of the end fitting, the locking means 44 is formed on the secondary part 13 so as to prevent movements in translation between the primary part and the vertebra of the wiper.

The locking means 44 is produced in one piece with the secondary part 13. In other words, the secondary part 13 and the locking means 44 are produced in one and the same mold and manufactured from one plastics material.

By way of example and according to the first variant, the locking means 44 is in the form of a protuberance 45 which extends into the internal volume 41 of the secondary part 13, in particular in a direction perpendicular to a plane which passes in the secondary direction 43 of the two hollow tubular portions 42 produced on the secondary part 13.

Such a protuberance 45 has an H-shaped section when it is cut in the plane defined hereinabove. Reinforcing ribs 46 are formed at the base of the protuberance, that is to say at the point at which it originates from the peripheral wall 38, so as to mechanically reinforce the connection between the peripheral wall 38 and the protuberance 45.

Figure 7:
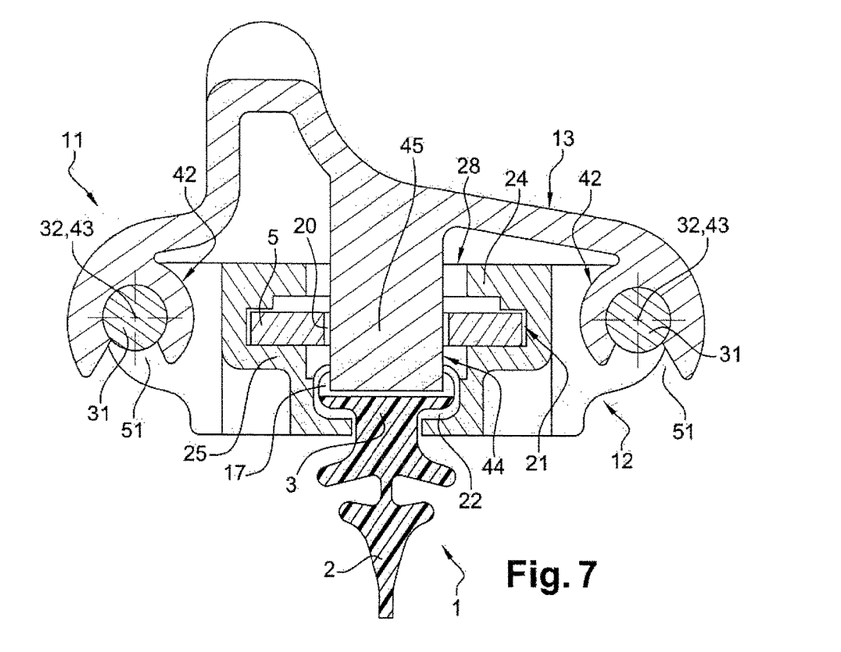
FIG. 7 is a cross-sectional view of the end fitting according to the first variant as installed on a wiper.

FIG. 7 shows the combination of the primary part 12 with the secondary part 13 in order to form the first variant of the end fitting 11 which immobilizes both the vertebra 5 and the wiper blade 1.

The heel 3 is delimited by an upper face and it will be seen that this upper face has a cutout 17 which extends over the entire width of the heel 3 and along a predetermined length, this width being determined by a direction perpendicular to the first axis 4 illustrated in FIG. 1. Such a cutout 17 engages with the constituent locking means 44 of the end fitting 11. The cutout 17 forms lateral edges against which the locking means 44 butts, thereby preventing any movement in translation between the end fitting 11 and the wiper blade 1.

The end of the vertebra 5 is also designed to receive the end fitting 11. This end of the vertebra comprises an orifice 20 passing through the vertebra 5 from one side to the other. Such an orifice 20 is produced at the center of the vertebra 5 along a transverse axis perpendicular to the first axis 4.

In FIG. 7, the cross section is made in a plane orthogonal to the first axis 4 and passing through the locking means 44.

The engagement between the tubular sector 31 of the primary part 12 in the hollow tubular portion 42 protruding from the secondary part 13 is particularly visible.

The slot 51 in the hollow tubular portion 42 is produced in the lower quarter of this cylindrical portion, that is to say the quarter opposite the peripheral wall 38 of the secondary part 13.

The hole 28 formed in the primary part is also apparent and it can be clearly be seen that this hole starts in the region of the upper wall 24, continues through the housing 21 which receives the vertebra 5, passes through the intermediate wall 25 and ends in the recess 22, in which the wiper blade 1 is housed.

The locking means 44 is installed in the hole 28 and comes into contact with the orifice 20 produced in the vertebra 5 and the cutout 17 produced in the wiper blade 1, the free end of the locking means 44 coming into contact with the heel 3 at the bottom of the cutout 17.

Figures 8, 9, 10:
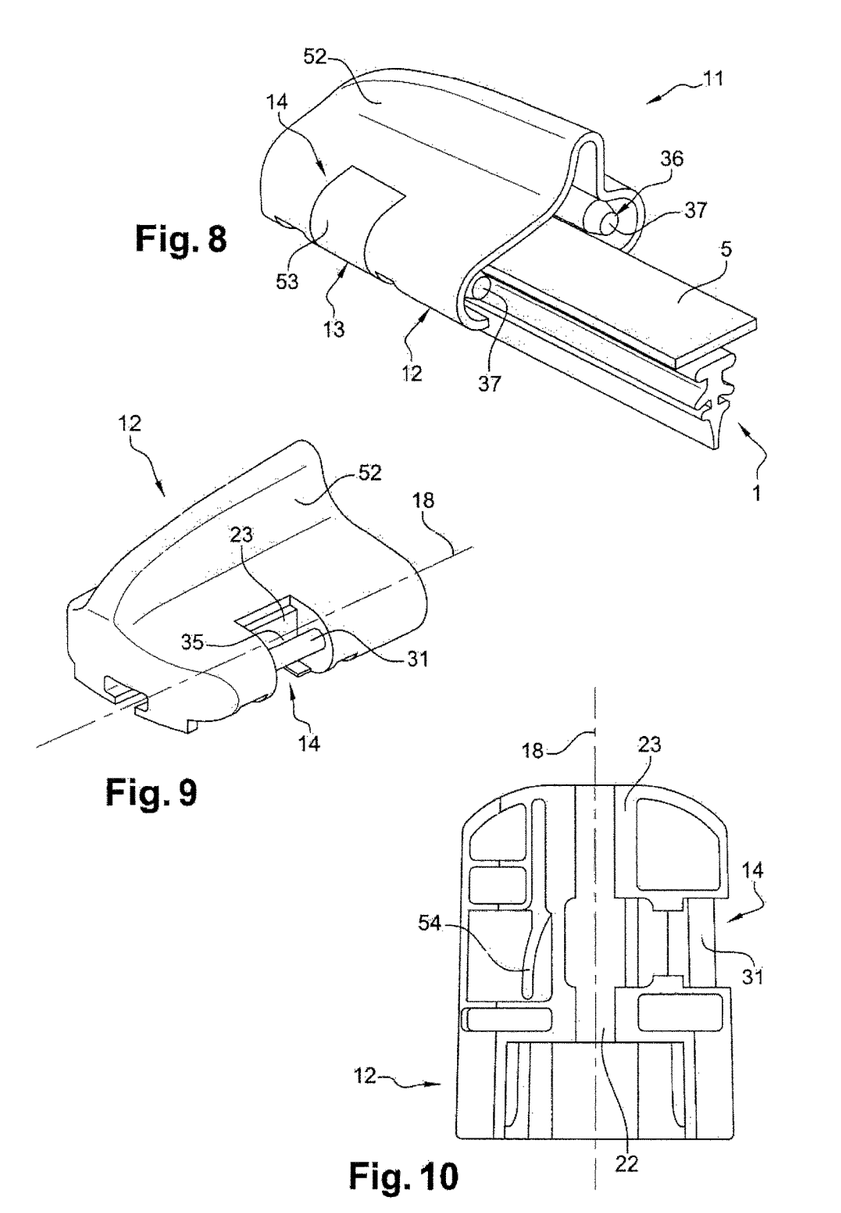
FIG. 8 is a perspective view of a second variant of an end fitting according to the invention installed at the end of a wiper.
FIGS. 9 and 10 show an embodiment of the primary part according to the second variant of the end fitting.

FIGS. 8 to 14 show a second variant of the end fitting 11. FIG. 8 illustrates this second variant installed at the end of a wiper, the support being omitted.

As for the first variant, the first part 12 seals the liquid channeling device by plugging the latter by means of constituent studs 37 of the blocking means 36. By contrast, the first part 12 differs from the one used in the first variant in that it comprises a flank 52 which follows the outer profile of the support of the wiper. In other words, the flank 52 has a shape corresponding to, or complementary with, the shape of the support, including that of the liquid channeling means and/or of the deflector. This flank 52 thus defines an outer periphery of the primary part 12 which follows a profile, known as the second profile.

The primary part 12 comprises the zone 14 which receives the secondary part 13. Unlike the first variant, the zone 14 is bordered by the second profile of the primary part 13.

The secondary part 13 also comprises a profile formed by a wall 53, known as the first profile, and the latter is in the continuation of the second profile. In other words, when the secondary part 13 is housed in the zone 14, the outer profile of the primary part 12 is completed by that of the secondary part 13 in line with the zone 14. Such a configuration makes the secondary part accessible for extraction by the user without harming the appearance of the end fitting 11, since the secondary part is inscribed in the continuation of the primary part.

FIG. 9 shows the primary part 12 of the second variant of the end fitting 11.

This primary part 12 is divided into two portions by the longitudinal axis 18. It will be noted that the part of the flank 52 which receives the deflector formed on the support of the wiper is offset laterally with respect to the longitudinal axis 18. In other words, and unlike the first variant, the two portions of the primary part 12 are not identical. The zone 14 is produced in the portion opposite that part of the flank 52 that receives the deflector with respect to the longitudinal axis 18.

As for the first variant, the zone 14 comprises a tubular sector 31, the two ends of which originate on the flank 52, the latter covering the body 23. The aperture 35 is likewise formed by a space with separates the tubular sector 31 and the body 23.

FIG. 10 is a bottom view of the primary part 12 according to the second variant of the end fitting. The recess 22 extends along the longitudinal axis 18 and the zone 14 is formed on the side of the body 23, that is to say laterally with respect to the longitudinal axis 18.

Opposite the zone 14 with respect to the recess 22 there can be found a latch 54 which is designed to move when the vertebra is introduced. The latter thus comprises a notch and the free end of the latch 54 bears against an edge surface of the vertebra in line with the notch. Such a disposition prevents the primary part 12 from moving in translation with respect to the vertebra.

Figure 13:
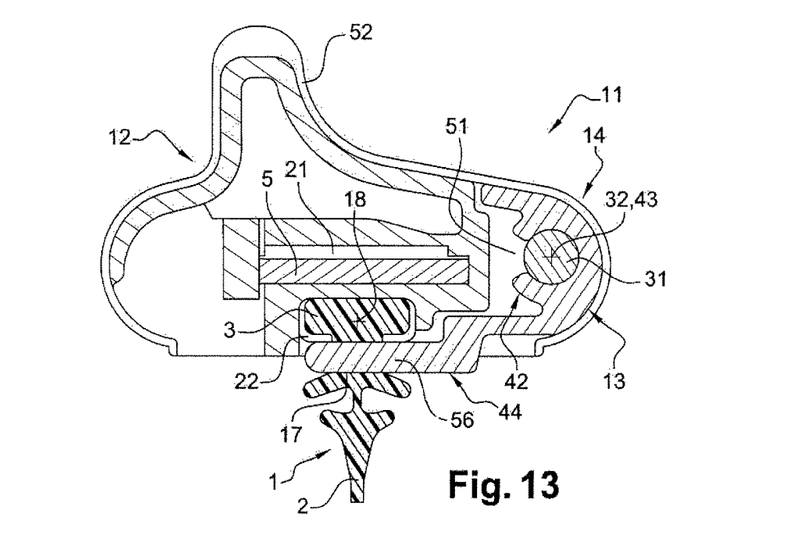
FIG. 13 is a cross-sectional view of the end fitting as illustrated in FIG. 8.
Figures 14, 15, 16:
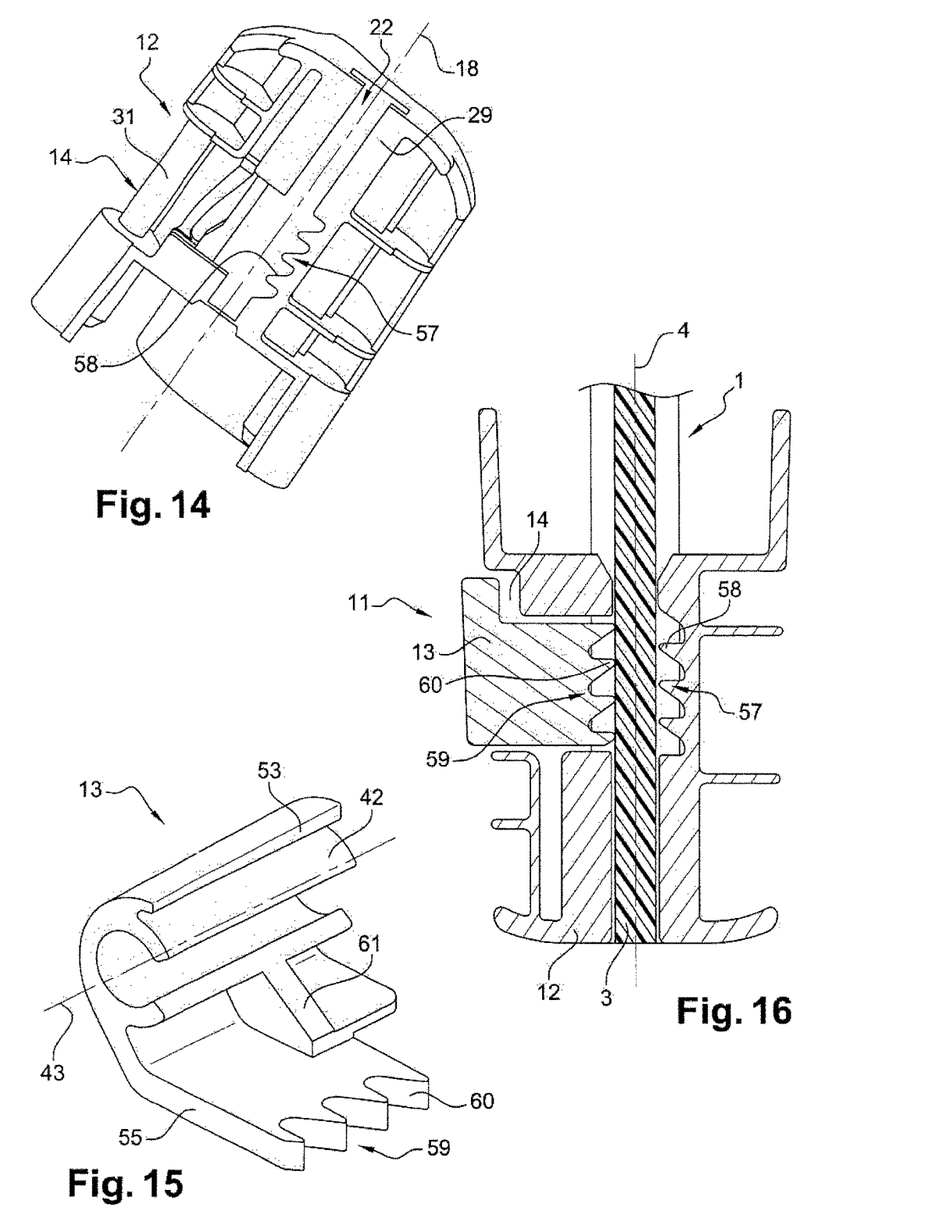
FIG. 14 shows a primary part used to produce a third variant of the end fitting.
FIG. 15 illustrates the secondary part used to produce the third variant of the end fitting, finally.
FIG. 16 shows, in a bottom view of the end fitting, the cooperation between the primary part, the secondary part and the blade.

FIGS. 13 and 14 illustrate in detail the secondary part 13 that is used in the second variant of the end fitting.

The wall 53 originates at the periphery of the hollow tubular portion 42. This wall 53 forms a wing which extends from the hollow tubular portion 42, the latter comprising the slot 51 that is necessary to allow the tubular sector of the primary part to enter into the circular arc formed by the hollow tubular portion 42. Opposite this wall 53 with respect to the hollow tubular portion 42 there can be found a plate 55 from which the locking means 44 protrudes.

According to this variant, the locking means 44 is formed by a finger 56 which extends in a rectilinear manner. This finger 56 has a circular section and extends in a direction parallel to the plane formed by the plate 55.

In FIG. 13, the cross section is made in a plane orthogonal to the first axis and passing through the locking means 44. The end fitting 11 is illustrated there according to the second variant and it can be seen that the primary part 12 comprises a single zone 14. The tubular sector 31 extends in the primary direction parallel to the longitudinal axis of the recess 22 and in a plane passing through an upper face of the vertebra 5.

The engagement between the tubular sector 31 of the primary part 12 in the hollow tubular portion 42 protruding from the secondary part 13 is particularly visible.

The slot 51 in the hollow tubular portion 42 is produced in the lateral quarter of this cylindrical portion, that is to say a quarter facing the housing 21.

According to this second variant, the cutout 17 made in the wiper blade 1 is produced between the heel 3 and the area 2 for rubbing. This cutout is in this case a hole which passes through the wiper blade 1 from one side to the other. This hole has an inside diameter equivalent to the outside diameter of the finger 56, this hole being produced along an axis orthogonal to the first axis of the wiper blade 1.

FIG. 13 shows an embodiment in which the zone 14 is opposite the shape of the flank 52 which receives the deflector with respect to the longitudinal axis 18. Of course, the invention covers the case in which the zone 14 is produced in the same portion of the primary part 12 in which the flank 52 has the shape receiving the deflector.

FIGS. 14 to 16 show a third variant of the end fitting according to the invention.

Only the differences with respect to the second variant will be described hereinbelow and reference should be made to the description of the latter in order to be acquainted with the structure of the elements that are identical to the second variant.

FIG. 14 shows the primary part 12 which comprises the first edge surface 29, the latter at least partially delimiting the recess 22.

In the continuation of the zone 14, it can be seen that the recess 22 is bordered by a primary coupling device 57 formed on the first edge surface 29. This primary coupling device 57 thus forms the locking device in that it represents the means which prevents the wiper blade from moving in translation along the longitudinal axis 18.

This primary coupling means 57 has a multiplicity of teeth 58 which are intended to bear against the wiper blade, for example between the heel and the zone for rubbing.

FIG. 15 shows the secondary part 13 used in this third variant of the end fitting 11.

Figures 11, 12:
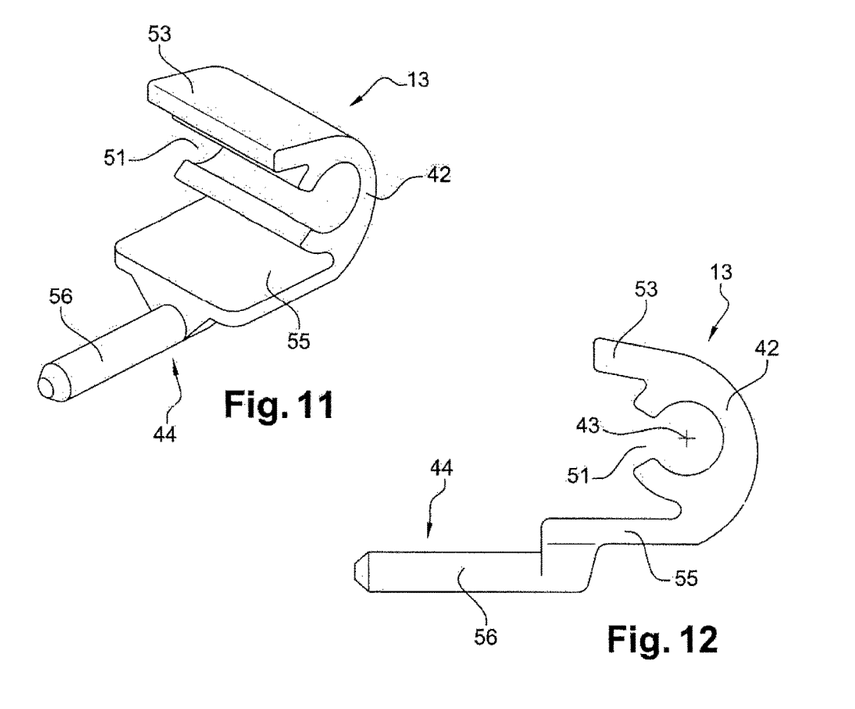
FIGS. 11 and 12 show an embodiment of the secondary part according to the second variant of the end fitting.

As for the primary part 12 described with reference to FIG. 14, only the differences with respect to the secondary part illustrated in FIGS. 11 and 12 will be described hereinbelow.

The plate 55 is terminated by a secondary coupling device 59 which is formed by a plurality of teeth 60. This secondary part 13 furthermore comprises a reinforcement 61 which forms a strut installed between the plate 55 and the hollow tubular portion 42. Since the immobilization of the wiper blade depends on the pressure produced by the secondary coupling device 59, such a reinforcement ensures that the plate 55 does not deform with respect to the hollow tubular portion 42.

FIG. 16 is a cross section through the end fitting 11 mounted on a wiper blade 1 made in a plane immediately below the primary and secondary coupling devices. It can be seen that the insertion of the secondary part 13 into the zone 14 causes the wiper blade 1 to bear both against the primary coupling device 57 and against the secondary coupling device 59. The wiper blade 1 is thus pinched between these two devices by means of the teeth 58 and 60 which pass into the wiper blade 1.

The plastics material of these teeth is harder than the constituent material of the wiper blade 1 and the latter thus deforms under the pressure of the teeth 58 and 60.

Such a pressure occurs when the secondary part 13 is mounted in the zone 14. Specifically, the force necessary for the teeth 58 and 60 to enter the wiper blade 1 results from the engagement between the tubular sector 31 of the primary part 12 with the hollow tubular portion 42 of the secondary part 13.

A wiper blade of a wiper comprising at least one end fitting according to the first variant illustrated in FIGS. 1 to 7 is replaced in the following way:

Extraction of the secondary part from the primary part by the secondary part being pulled in a direction perpendicular to the plane which passes through the upper wall of the primary part, Removal, by a movement in translation, of the wiper blade to be replaced, the primary part remaining secured to the wiper, Insertion of a new wiper blade by a movement in translation, threading it into the recess in the primary part, Alignment of the wiper blade with one end of the primary part, Mounting of the secondary part on the primary part by means of clip-fastening implemented by engagement between at least one tubular sector and one hollow tubular portion.

As far as the second and third variants are concerned, the wiper blade is changed by replacing the first step with the following step:

Extraction of the secondary part from the primary part by the secondary part being pulled in a direction parallel to a plane which passes through the housing and the primary direction which defines the center of the tubular sector. The other steps are identical.

The invention claimed is:

1. A wiper assembly comprising:
a wiper blade extending lengthwise along a first axis; and
an end fitting of the wiper blade consisting of a primary part configured to cooperate with a secondary part, the primary part comprising:
a recess that is able to receive the wiper blade and extends along a longitudinal axis to be aligned with the first axis of the wiper blade when the wiper blade is received by the recess; and
a zone formed laterally with respect to the longitudinal axis and receiving the secondary part of the end fitting, said zone comprising a tubular sector that protrudes from and connects at least two opposing surfaces of the primary part in a primary direction that is parallel to the longitudinal axis, the tubular sector having a circular cross section orthogonal to the primary direction,
wherein at least one blocking means, separate from the tubular sector, is provided and configured to plug a liquid channeling device that is a constituent part of a support to which the wiper blade is attached.

2. The primary part for the wiper assembly as claimed in claim 1, wherein the tubular sector comprises at least two protrusions configured to engage the secondary part.

3. The primary part for the wiper assembly as claimed in claim 1, wherein the tubular sector has a cylindrical section.

4. The primary part for the wiper assembly as claimed in claim 1, comprising a body in which the recess is formed, said primary part having an aperture between the body and the tubular sector.

5. The primary part as claimed in claim 1, wherein said recess is bordered by a primary coupling device that is able to bear against the wiper blade.

6. A wiper assembly, comprising:
   a wiper having at least one wiper blade extending lengthwise along a first axis; and
   an end fitting of the wiper with a primary part and a secondary part, the primary part comprising:
      a recess that is able to receive the wiper blade and extends along a longitudinal axis to be aligned with the first axis of the wiper blade when the wiper blade is received by the recess; and
      a zone formed laterally with respect to the longitudinal axis and receiving the secondary part of the end fitting, said zone comprising a tubular sector that protrudes from a surface of the primary part in a primary direction that is parallel to the longitudinal axis, the tubular sector having a circular cross section orthogonal to the primary direction; and
   the secondary part being separate from a support of the wiper to which the wiper blade is attached, comprising:
      a locking means able to immobilize the wiper blade with respect to the primary part that is a constituent part of the end fitting; and
      a fastening means mechanically connecting the secondary part to the zone of the primary part, wherein the fastening means is at least one hollow tubular portion, the periphery of which has a slot extending along an axis which is parallel to the primary direction when the slot engages the tubular sector of the primary part, along a secondary direction which is perpendicular to the primary direction of the tubular sector,
   wherein at least one blocking means, separate from the tubular sector, is provided and configured to plug a liquid channeling device that is a constituent part of the wiper.

7. The wiper assembly as claimed in claim 6, wherein the secondary part comprises a wall which originates on at least the hollow tubular portion and forms a first profile, the primary part comprises a flank which defines an outer periphery of the primary part and forms a second profile, and wherein the first profile is structurally different from the second profile.

8. The wiper assembly as claimed in claim 6, wherein the liquid channeling device is a constituent part of the support.

9. The wiper as claimed in claim 8, wherein the at least one blocking means of the primary part comprises studs and the locking means of the secondary part is formed by a finger that extends in a rectilinear manner.

10. The wiper assembly as claimed in claim 6, wherein the primary part comprises the at least one blocking means.

11. The end fitting as claimed in claim 10, wherein the at least one blocking means of the primary part comprises studs and the locking means of the secondary part is formed by a finger that extends in a rectilinear manner.

* * * * *